United States Patent
Brems

[11] Patent Number: 4,679,666
[45] Date of Patent: Jul. 14, 1987

[54] WEIGHT RESPONSIVE ROTARY RETARDATION DEVICE

[76] Inventor: John H. Brems, Apt. 11-G, 2800 S. Ocean Blvd., Boca Raton, Fla. 33432

[21] Appl. No.: 327,516

[22] Filed: Dec. 4, 1981

[51] Int. Cl.⁴ .......................................... F16D 57/00
[52] U.S. Cl. ................... 188/290; 104/127; 105/150; 188/195; 198/465.1
[58] Field of Search ........................ 188/290, 195, 176; 192/58 B, 58 C, 89 W; 105/148, 150; 104/89, 93, 127, 128; 410/126, 131, 139; 198/465.5

[56] References Cited

U.S. PATENT DOCUMENTS

| | | | |
|---|---|---|---|
| 1,471,186 | 10/1923 | Meyer | 188/290 |
| 1,917,972 | 7/1933 | Henriot | 188/290 X |
| 2,253,001 | 8/1941 | Webb et al. | 192/58 B |
| 2,313,132 | 3/1943 | Elliott | 192/58 C |
| 2,466,327 | 4/1949 | Rieber | 188/290 X |
| 2,605,061 | 7/1952 | Howe | 188/290 X |
| 2,684,743 | 7/1954 | Trofimon | 192/58 C X |
| 3,384,212 | 5/1968 | Hill | 192/58 C X |
| 3,536,173 | 10/1970 | Merkert | 192/58 C X |
| 3,648,815 | 3/1972 | Wochner | 188/290 X |
| 4,215,772 | 8/1980 | Graham | 193/35 A |
| 4,299,428 | 11/1981 | Fanck | 188/195 X |

FOREIGN PATENT DOCUMENTS 780441 4/1935 France .................... 192/58 C

Primary Examiner—George E. A. Halvosa
Attorney, Agent, or Firm—Barnes, Kisselle, Raisch, Choate, Whittemore & Hulbert

[57] ABSTRACT

A gravity powered part transfer system in which parts are suspended on a rotating member from a declining track or rail. The rotating member is associated with a viscous fluid in a manner which permits the active fluid to be altered in thickness in response to increase or decrease of weight. The greater the weight, the less the thickness of the fluid acting on the rotating member and the greater the retardation torque.

14 Claims, 13 Drawing Figures

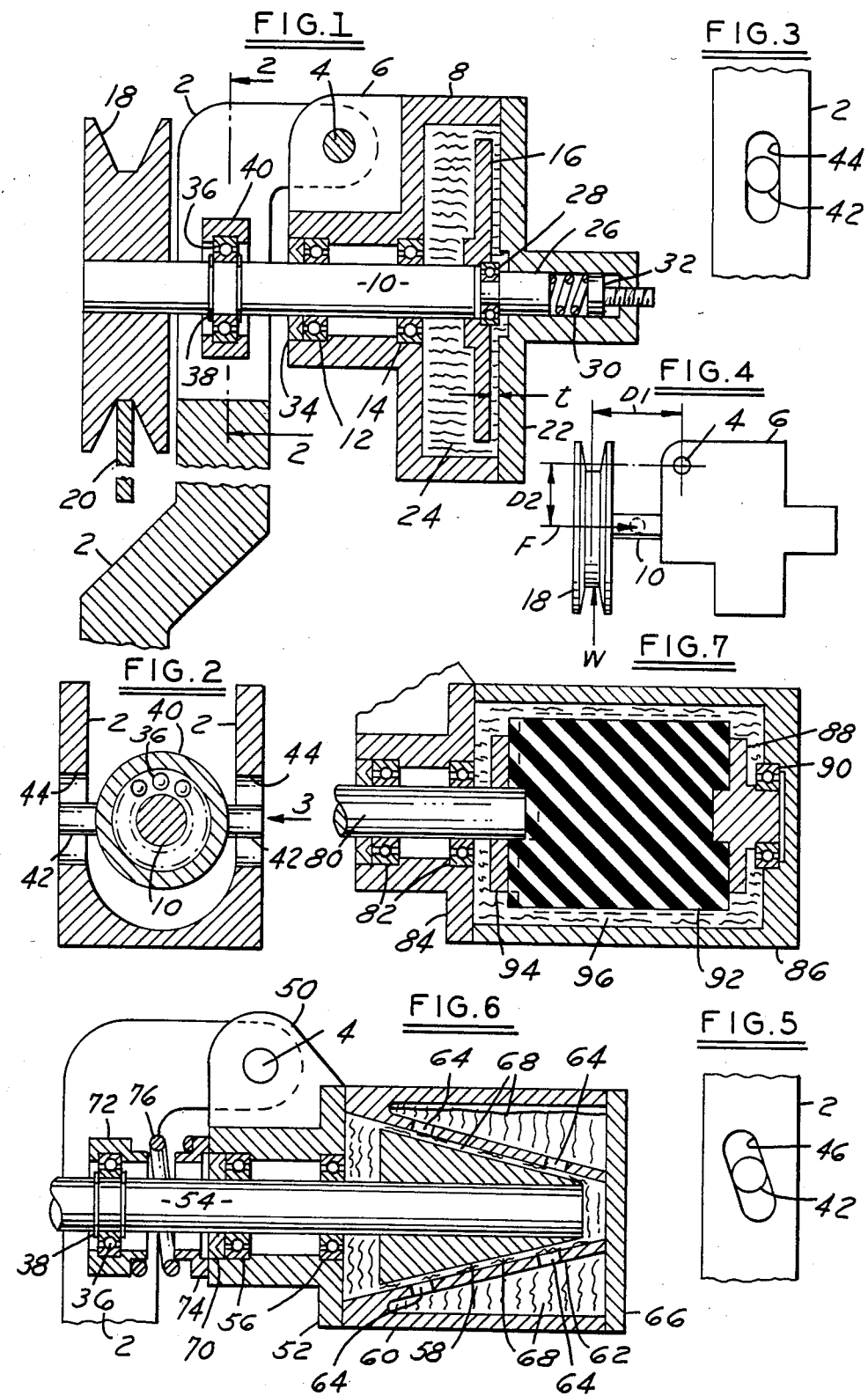

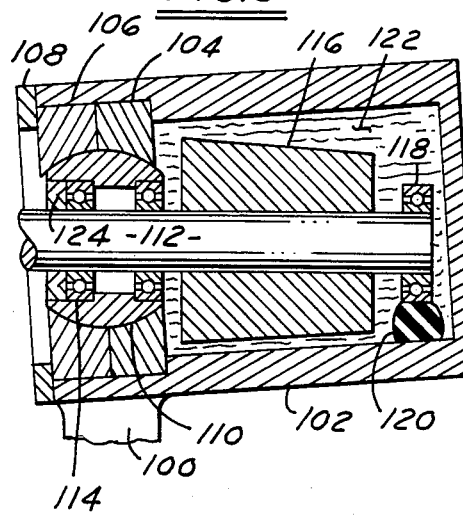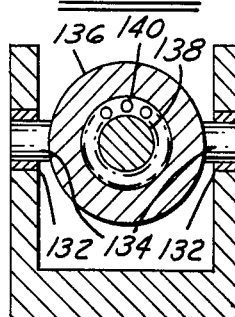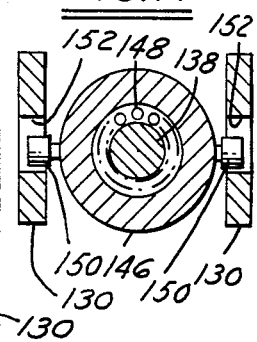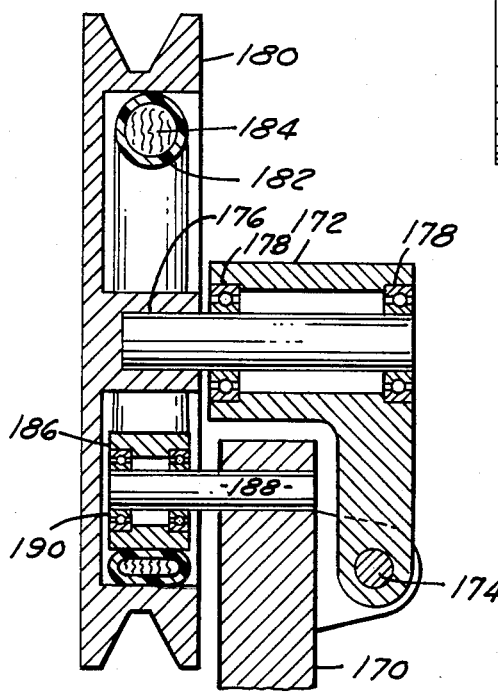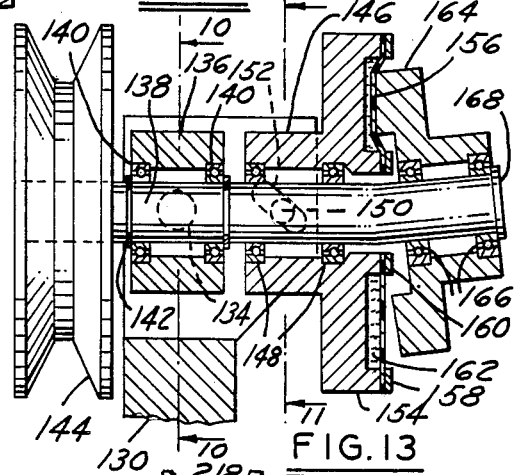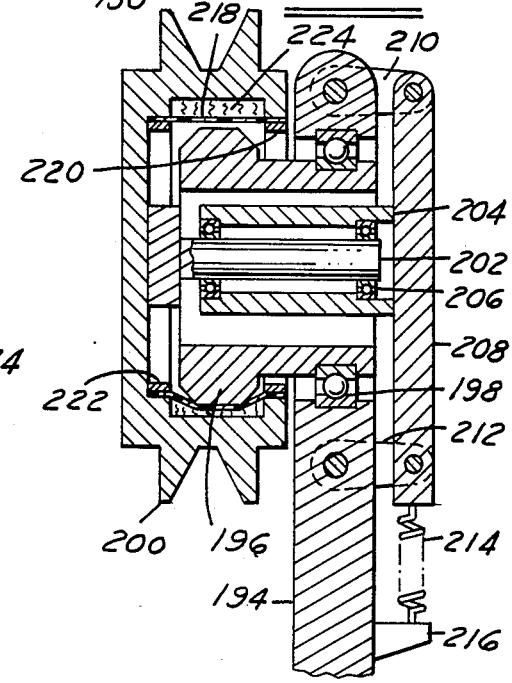

WEIGHT RESPONSIVE ROTARY RETARDATION DEVICE

FIELD OF THE INVENTION

Gravity powered part transfer system in which viscous fluid is utilized to control the velocity of a rotating member.

BACKGROUND OF THE INVENTION

In the field of gravity powered part transfer systems, applications arise which require speed control or retardation systems in which it is desired that the speed of movement be reasonably constant even though the mass being controlled is variable. One such type of application is shown in my copending patent application, Ser. No. 176,562, filed Aug. 8, 1980, now U.S. Pat. No. 4,316,535, issued Feb. 23, 1982. A type of device which is particularly suitable for creating a retardation force or torque proportional to the velocity of movement employs a viscous fluid operating in shear between a fixed housing and a movable rotor.

Such devices generally have a fixed ratio of torque to velocity which can be altered only by changing the viscosity of the fluid or the geometrical properties of the device. In applications such as my aforesaid copending application, where the applied load is created by a mass rolling down an inclined slope, the velocity will be approximately proportional to the mass. It is one object of this invention to provide a system in which the retardation is approximately proportional to the mass being supported, whereby the velocity reached is approximately constant, independent of mass.

In another copending patent application, Ser. No.327,515, filed Dec. 4, 1981, now U.S. Pat. No. 4,497,393 an invention is disclosed for a viscous retardation device which requires no moving seals, and in which the viscous fluid is contained in a chamber, a portion of which is a flexible membrane. It is another object of this invention to incorporate this hermetic sealed fluid enclosure with the weight responsive retardation system.

Other objects and features of the invention will be apparent in the following description and claims in which the principles of the invention are set forth together with details of the structure to enable those skilled in the art to practice the invention, all in connection with the best mode presently contemplated for the invention.

BRIEF DESCRIPTION OF THE DRAWINGS

Drawings accompany the disclosure and the various views thereof may be briefly described as:

FIG. 1, a longitudinal cross-section through a first embodiment of this invention;

FIG. 2, a transverse section taken on line 2—2 of FIG. 1;

FIG. 3, a side view taken along arrow 3 of FIG. 2.

FIG. 4, a free body diagram of the embodiment of FIG. 1 showing the moments exerted thereon;

FIG. 5, an alternate arrangement of the slots shown in FIG. 3;

FIG. 6, a longitudinal cross-section through an embodiment employing a conical rotor;

FIG. 7, a longitudinal cross-section through an embodiment utilizing an expandable rotor;

FIG. 8, a longitudinal cross-section through an embodiment having a tilting rotor;

FIG. 9, a longitudinal cross-section of an embodiment employing an annular flexible membrane;

FIG. 10, a transverse section taken on line 10—10 of FIG. 9;

FIG. 11, a transverse section taken on line 11—11 of FIG. 9;

FIG. 12, a longitudinal cross-section of an embodiment utulizing a sealed toroidal tube for retardation; and FIG. 13, a longitudinal cross-section of an embodiment shaving a cylindrical flexible membrane within a supporting wheel.

Description of the Invention and the Manner and Process of Using it

Referring to FIGS. 1, 2 and 3, a hanger 2 is bifurcated at its upper end; at its lower end a pallet or carrier (not shown) is suspended in applications such as disclosed in my copending patent application, Ser. No. 176,562. The hanger 2 is connected through a pivot pin 4 to a lug 6 on a housing 8. A shaft 10 is journalled in the housing 8 through bearings 12 and 14 which are loosely fitted on the shaft 10, permitting axial motion of the shaft in the bearings. One end of the shaft 10 is formed into a disc 16; to the other end of the shaft 10 is mounted a double flanged wheel 18 which rides on a supporting track 20. A cover 22 is mounted to the housing 8 forming an enclosed chamber which is filled with a viscous fluid 24.

The cover 22 is clamped to housing 8 by suitable headed bolts or screws, not shown, and similar closing plates in the following embodiments are mounted in a similar manner. An axially movable plunger 26 is mounted in the cover 22; this plunger is substantially coaxial with the shaft 10 and is connected thereto through a thrust bearing 28. The other end of the plunger 26 is contacted by a spring 30, which is in turn backed up by an adjustment screw 32 threaded into the cover 22. A seal 34 retains the viscous fluid 24 in the cavity formed by the housing and cover. A load bearing 36 is axially retained on the shaft through snap rings 38; the outer race of the bearing 36 is mounted in a case 40 which has formed on it two coaxial pins 42 (FIG. 3), whose common centerline is substantially coplanar with the axis of shaft 10. The pins 42 engage vertical slots 44 formed in the bifurcated arms of the hanger 2.

In a general application, the track 20 will be sloped, i.e., inclined to the horizontal, and the weight suspended on hanger 2 will cause the wheel 18 to roll downward on the track 20. This will create an angular rotation of the shaft 10 causing a shearing of the fluid 24 between the disc 16 and the cover 22. This shearing of the fluid creates a torque proportional to the velocity of the disc for a given disc area and fluid film thickness. At some velocity, the fluid shear torque will be in equilibrium with the applied torque caused by the weight on the inclined track.

The thickness of the fluid film between the cover 22 and disc 16 is not a fixed thickness in this system. If a free body diagram of the housing lug 6, shaft 10, and wheel 18, is constructed, FIG. 4, it can be seen that there exists a clockwise moment about pin 4 created by the upward (reaction) force of the track 20 on the wheel, which is equal to the total weight, W, supported by the rail, times the horizontal distance, $D_1$, from the center of pin 4 to the center of the wheel 18. For equilibrium of moments, this must be equal to a counterclockwise moment created by a force, F, exerted to the right on the shaft 10 through bearing 36, case 40 and pins 42 through slots 44 by hanger 2, times the vertical distance, $D_2$, from the center of shaft 10 to the center of pin 4. Therefore:

$$F \times D_2 = W \times D_1 \quad (1)$$

or $$F = D_1/D_2 W \quad (2)$$

This force F acting through the thrust bearing 28 and plunger 26 tends to compress the spring 30, thereby decreasing the film thickness t (FIG. 1). It can be seen therefore that as the weight supported by the hanger 2 is increased, the force reacted by the spring 30 is increased and the viscous fluid thickness t is decreased, dependent on the spring constant of the spring 30. If the undeflected length of the spring is defined as $L_o$ and its deflected length under a load F defined as L, and the spring has a rate, K, in force/length units, then:

$$F = K(L_o - L) \quad (3)$$

If $t = t_o @ L = L_o$ and $\quad (4)$ $t = t @ L = L$ then $F = K (t_o - t)$

Combining equations 2 and 4, $$\frac{D_1}{D_2} W = K (t_o - t)$$

$$\frac{D_1}{K D_2} W = (t_o - t) \quad (5)$$

$$t = t_o - \frac{D_1}{K D_2} W \quad (6)$$

Equation 6 shows t as becoming smaller in a linear fashion as W becomes larger, if the spring constant K is a constant.

The fluid in shear on the other side of the disc 16 also has its thickness increased, but this creates only a very minor effect.

This viscous retardation torque, T, of a system as shown in FIG. 1, and for a given disc diameter and fluid viscosity, is proportional to the angular velocity, $\omega$, of the shaft 10 and inversely proportional to the fluid thickness t. Therefore, $$T = C_1 \omega/t \quad (7)$$

where $C_1$ is some constant, which is a function of disc area and fluid viscosity.

In a given application, in which the wheel 18 is rolling down an inclined track of fixed inclination, it is desired that the retarding torque T be proportional to the weight W for a given speed.

$$T = C_2 W \quad (8)$$

By substituting equation 8 in equation 7, $$C_2 W = C_1 \frac{\omega}{t} \quad (9)$$

$$Wt = \omega \frac{C_1}{C_2}$$

From equation 9, it can be seen that for $\omega$, the angular velocity, to remain constant for various values of weight W, it is necessary for thickness t to be inversely proportional to W; t and W are therefore related by a hyperbolic curve. As W becomes larger, t must become smaller proportionally for $\omega$, the angular velocity, to remain the same.

From equation 6, it was seen that t does become smaller as W becomes larger, but in a linear relationship. Therefore, from a mathematical point of view, a straight line can intersect a hyperbola, at only two theoretical points, and a perfect condition of maintaining a true constant velocity can occur at only two specific weights. However, by a judicious choice of the other variables, it becomes possible to approximate a constant velocity over a range of weights of approximately 3 or 4 to 1.

The foregoing presumes a constant value of the spring constant K. But if the spring 30 is made nonlinear, as by using a variable pitch spring, or a spirally wound spring, such that K is a variable which becomes larger as W is increased, then it becomes possible to obtain a very good correspondence between equations 6 and 9, and t will, in effect, adjust itself to various values of W (from equation 6) such that when these combinations of W and t are used in equation 9, the angular velocity $\omega$ reached is substantially constant for a wide range of weights W.

In essence, then, as the weight on the arm 2 is increased, the gap t is decreased such that the retarding torque goes up in substantial proportion as the weight. This being the case, the wheel 18 will control the velocity of descent along the downwardly sloping track 20 to maintain a substantially constant velocity over a wide range of load weights.

While the spring 30 is shown as a conventional coiled wire spring, it also is possible to use a conical disc spring, or an elastomer such as neoprene or polyurethane which can be shaped to provide the non-linear characteristics desired.

In the free body diagram of FIG. 4, the axial force F was determined by the formula (2).

$$F = D_1/D_2 W$$

This is based on the use of vertical slots 44 in the hanger 2 which creates a true inward force on the shaft 10 along its axis, ignoring the small friction. However, if the slots are inclined as shown with the slots 46 in FIG. 5, the direction of the force vector F is inclined to be substantially perpendicular to the walls of the slots 46. This in turn changes the moment arm $D_2$ of this vector. Since the total moment must be constant and equal to $W \times D_1$, the generated force F will become larger as $D_2$ decreases and smaller as $D_2$ increases. This then is another method of controlling the gap t. Furthermore, by making the slots 46 curved rather than straight, it becomes possible to introduce non-linearity into the force-weight relationship by this means also, in addition to, or as a substitute for, the non-linearity of the spring.

In FIG. 6, a second embodiment employing a conical rotor in place of a circular disc is shown. A hanger 2 is again used to support the pallet or carrier for a workpiece not shown; the hanger 2 is pivot connected to a lug 50 which is part of a hub 52. A shaft 54 is journalled in the hub 52 through bearings 56. At its left end the shaft again mounts a wheel 18 rolling on an inclined track 20 as in FIG. 1; at its other end, the shaft 54 mounts a conical rotor 58. A housing 60 is mounted to the hub 52 concentric to the shaft 54 and rotor 58. This housing 60 has a cylindrical outside shell and a conical inner shell 62 having the same cone angle as the rotor 58. Between these two shells is formed an annular cavity of triangular cross-section; a series of small holes 64 are formed in the conical shell 62 for fluid circulation purposes as will be explained. A cover 66 seals the end of the housing, forming a cavity between the hub 52, housing 60 and cover 66 which is almost but not entirely filled with a viscous fluid 68; a seal 70 between hub 52 and shaft 54 is used to retain the fluid 68 in the cavity.

A load bearing 36 is again retained on the shaft 54 through snap rings 38, while the shaft 54 is again free to move axialy in bearings 56. The bearing 36 is again retained in a case 72 fitted with pins operating in slots in the hanger 2 as in FIG. 1. A spring seat 74 is mounted on the hub 52, and a compression spring 76 acts between this seat 74 and the bearing case 72.

It can be seen that this embodiment is substantially similar to the embodiment of FIG. 1 except that the reaction spring for the shaft axial loading is external, rather than internal and that the fluid in shear exists between the conical rotor 58 and the conical shell 62. This latter arrangement allows greater axial movement of the shaft for a given change in the fluid shear thickness, and the use of an external larger spring allows for greater flexibility of spring design. As the weight supported by the hanger 2 is increased, the rotor 58 is moved to the right against spring 76, as was explained in connection with the first embodiment. The holes 64 in the shell 62 permit the fluid to change thickness more rapidly than if they were absent, and the decrease in thickness of the fluid in shear increases the retarding torque. Using calculations similar to the prior analysis, the retarding torque will rise approximately proportionally to the weight supported, causing the velocity of descent to be approximately constant over a useful range of weight variations.

Another variation of this invention which employs an axially moving shaft to effect a change in retardation torque is shown in FIG. 7. It will be understood that the hanger 2, wheel 18, inclined track 20, bearing 36, snap rings 38, bearing case 40, pins 42 and slots 44 in hanger 2 are substantially identical with these elements in FIGS. 1-3. In FIG. 7, the shaft 80 is again mounted with axial freedom through bearings 82 in hub 84. A shell housing 86 is mounted to the hub 84 concentric with the shaft 80, and a flanged stub shaft 88 is journalled therein through bearing 90. An elastomeric cylinder 92, such as neoprene or polyurethane, is piloted and clamped between the flanged stub shaft 88 and a flange 94 mounted on the shaft 80. The cavity within the housing 86 and hub 84 is filled with a viscous fluid 96, and this fluid, acting between the outside diameter of the cylinder 92 and the inside diameter of the housing 86, is sheared during the rotation of shaft 80 generating a retarding torque.

As in the prior embodiments, the weight carried by the system generates a substantially proportional axial force to the right on shaft 80. In FIG. 7, this axial force is reacted by the elastomeric cylinder 92. As this force increases, the length of the cylinder 92 decreases and its diameter increases. Furthermore, this response to the axial force is non-linear, becoming stiffer as the force increases, which is exactly the non-linearity desired. As the diameter of the cylinder 92 increases in response to the increased axial force exerted by shaft 80, the thickness of the fluid in shear between the cylinder outside diameter and the fixed inside dianeter of the shell is decreased and a greater retarding torque is generated for a given speed. With a proper choice of variables, an excellent approximation of retarding torque proportional to weight carried can be achieved.

An embodiment achieving the same ends through a different arrangement is shown in FIG. 8. A hanger 100 is attached to a housing 102. A split front cover 104 and 106 is clamped into place in the housing 102 by a clamp ring 108 with suitable headed bolts or screws not shown. This split front cover 104, 106 is formed with a spherical seat in its center into which is fitted a spherical bearing holder 110. A shaft 112 is journalled in the holder 110 through bearings 114. A flanged wheel, not shown, such as wheel 18 in FIG. 1, is mounted on the left end of the shaft 112. Within the housing 102, a conical rotor 116 is mounted on the shaft 112, while at its outboard end, the shaft 112 is supported by a bearing 118, which is supported by a resilient elastomeric pad 120 mounted in the housing 102. As before, the cavity within the housing 102 is filled with a viscous fluid 122, and this fluid is retained by a shaft seal 124.

It can be seen that the wheel and track exert a clockwise moment on the shaft 112 as viewed in FIG. 8. This clockwise moment creates a movement of the spherical bearing holder 110 in the spherical seat of the front covers 104, 106; and the moment is reacted by the bearing 118 and resilient pad 120. As the weight on the hanger 100 is increased, this moment is increased and the load on the resilient pad 120 is increased, causing a greater deflection of this pad. This, in turn, brings the lower conical surface of the rotor 116 into closer proximity to the inside diameter of the housing 102, thinning the fluid therebetween which increases the retardation torque of the system. The deflection characteristics of the pad 120 are non-linear becoming stiffer with increased deflection. Therefore, it is possible to approximate the increase in retardation torque to the increase in weight suspended by the hanger 100.

Referring to FIGS. 9, 10 and 11, another embodiment to achieve the same result through a different detail technique is shown. A hanger 130 is suspended pivotally through journal bearings 132 on two pins 134 extending from a bearing housing 136. A shaft 138 is journalled in the housing 136 through bearings 140 which are axially locked in place through snap rings 142. A wheel 144 is mounted on one end of the shaft 138; it will be understood that this wheel operates on an inclined track. A retarder housing 146 is journalled on the shaft 138 through bearings 148 which are free to slide axially on the shaft 138. Two cam follower type rollers 150 are mounted in the sides of the retarder housing 146 on a common axis and engage inclined slots 152 in the hanger 130. The retarder housing 146 is formed into a flange 154 into which an annular cavity is recessed; this cavity is made into a sealed enclosure by an elastomeric, flexible membrane 156 sealed in place by clamp rings 158 and 160. The cavity in the flange 154 is filled with a viscous fluid 162.

The outboard end of the shaft 138 is bent through a slight angle and a pressure plate 164 is journalled on this angled section of shaft 138 through bearings 166, held in position by a retainer 168. One face of the pressure plate 164 is formed into an annular conical surface which contacts the flexible membrane 156, deforming it and the fluid 162 behind it.

It can be seen that as the wheel 144 is rotated, the shaft 138 rotates with it. The angled section of the shaft wobbles and the pressure plate 164 journalled thereon describes a nutating motion, whereby the area of contact between the pressure plate and the membrane rotates about an annular path. The deflected portion of the membrane follows this annular path, as must the fluid 162 behind the membrane. The progressive deformation of the fluid through the membrane is accomplished by internal shearing within the fluid which creates a retarding torque on the shaft 138. This retarding torque is proportional to the angular velocity of the shaft and also to the degree or depth of deformation of the fluid. This depth of deformation is dependent on the weight carried by the hanger as will be explained.

The weight carried by the hanger is reacted by an equal upward force on the wheel by the track. This creates a clockwise moment on the shaft and bearing housing 136 about the pins 134. This moment is reacted by the rollers 150 in the slots 152. The greater the moment, the more the rollers are forced downard in the slots, and this downward movement forces the retarder housing to move to the right against the pressure plate, increasing the depth of depression of the membrane and creating a larger deformation of the fluid behind it. The membrane becomes the elastic element in the system and its deformation as a function of force is non-linear becoming stiffer with increased deflection.

Since the depth of deformation of the fluid is increased with increased weight supported by the hanger, the retarding torque is again increased with increased weight approximating the condition desired.

Another embodiment of a weight responsive retarder in which the retarding fluid is retained in a sealed membrane is shown in FIG. 12. A hanger 170 again supports a pallet or comparable load carrier, not shown. A bearing housing 172 is pivot connected to the hanger 170 through a pivot pin 174. A shaft 176 is journalled in the housing 172 through bearings 178; this shaft in turn supports a wheel 180 which again rides on an inclined track, not shown. The wheel 180 is recessed and into the inside diameter so created is fitted a toroidal tube 182 of elastomeric material filled with a viscous fluid 184. A load roller 186 is journalled on a shaft 188 through bearings 190; this shaft 188 is mounted in the upper end of the hanger 170. The load roller 186 is positioned to contact and depress the tube 182 and deform the fluid 184 retained therein.

As the wheel 180 is rotated as the assembly rolls down an inclined track, the area of fluid deformation progresses along the tube 182 and since this is accomplished through internal shearing within the fluid, a retarding torque proportional to velocity is generated. Furthermore, it can be seen that the amount of deformation is dependent on the weight suspended by the hanger 170 and transferred to the wheel 180 through the load roller 186 and therefore the retarding torque is approximately proportional to this weight.

FIG. 13 shows another embodiment in which the fluid for retardation is located within the supporting wheel. A hanger 194 supports a carrier as before; an annular load roller 196 is journalled in the upper end of the hanger 194 through a four point contact bearing 198 capable of accepting the required loads. A wheel 200 rides on an inclined track as before; this wheel is carried on a flanged shaft 202 journalled in a bearing housing 204 through bearings 206. The housing 204 is suitably supported by a vertical link 208, which is connected to the hanger 194 through pivot connected parallelogram links 210 and 212. A tension spring 214 is connected between the link 208 and a bracket 216 on hanger 194.

The inside of the wheel 200 has an annular recess formed into its inside diameter. This recess is sealed with a cylindrical flexible membrane 218 which is held in place with clamp rings 220 and 222 expanded into place or wedged tightly by a circumferential wedge. The sealed cavity thus formed is filled with a viscous fluid 224.

It can be seen that the weight carried by the hanger 194 and supported by the wheel 200 is internally carried by the tension spring 214 and by the membrane 218; therefore, as the weight is increased, the membrane is more greatly deflected and the fluid 224 sealed thereunder is more greatly deformed.

Rotation of the wheel, as it rolls on the descending track causes a progressive deformation of the fluid 224, which is accomplished through internal shearing creating a retarding torque proportional to the velocity. Furthermore, since the amount of fluid deformation is increased with increasing weight carried by the hanger, this retarding torque is approximately proportional to this weight.

I claim:

1. In a system in which a carrier or pallet for a weight to be supported is moved by gravity down an inclined track whereby the velocity of movement is retarded by a rotary device for angular velocity control in which the retarding torque is substantially proportional to the angular velocity, and which utilizes the shearing of a viscous fluid to create said retarding torque, that improvement which includes weight responsive means to increase said retarding torque in response to the increase in a weight supported by said carrier, comprising:
   (a) a first torque means,
   (b) a second torque means mounted for rotation relative to, and with variable proximity to, said first torque means,
   (c) viscous fluid means positioned between said first and second torque means,
   (d) elastic means acting between said first and second torque means biased to separate said first and second torque means, and
   (e) connecting means operating between said first and second torque means and responsive to said supported weight to increase the proximity of said torque means in response to an increased supported weight, whereby a relative rotational movement between said torque means causes an internal shearing of said viscous fluid means creating a retarding torque substantially proportional to the angular velocity of said relative rotational movement, and said internal shearing of said viscous fluid means is increased by an increase of proximity of said torque means in response to an increase of said supported weight creating an increase in said retarding torque in response to an increase in said supported weight.

2. A system as defined in claim 1 in which said first torque means comprises a hollow cylinder containing a quantity of viscous fluid, and said second torque means comprises a member mounted in said cylinder having a surface in a plane normal to the axis of said cylinder, said second torque means being movably mounted to move in the direction of said axis toward an end of said cylinder in response to an increase in said supported weight.

3. A system as defined in claim 1 in which said first torque means comprises means forming a recess, the walls of which are defined by a line moving in revolution around a fixed axis at a predetermined angle to said fixed axis, and said second torque means comprises a member within said recess having an outer wall defined by a line moving in revolution about an axis at a predetermined angle, said outer wall being positioned in substantially parallel relation to the walls of said recess and movable toward the recess wall in response to an increase in said supported weight.

4. A system as defined in claim 1 in which said first torque means comprises means forming a conical recess having a first axis and containing a quantity of viscous fluid, and said second torque means comprises a cone mounted in said recess movable in the direction of said first axis wherein the outer surface of said cone approaches the inner surface of said conical recess in response to an increase in said supported weight.

5. A system as defined in claim 1 in which said first torque means comprises a hollow cylinder having a first axis and containing a quantity of viscous fluid, and said second torque means and said elastic means comprise a second cylinder mounted in said hollow cylinder on an axis coincident with or parallel to said first axis, said second cylinder being formed of an expansible material which expands radially in response to an increase in said supported weight, the expansion causing the walls of said second cylinder to move toward the inner walls of said hollow cylinder.

6. A system as defined in claim 1 in which said first torque means comprises a hollow cylinder having a first axis and containing a quantity of viscous fluid, and said second torque means comprising a truncated cone mounted on a second axis angled to said first axis, and means mounting said second torque means to permit a tilting with respect to said first axis wherein the wall of said cone moves closer to the inner wall of said hollow cylinder in response to an increase in said supported weight.

7. A system as defined in claim 1 in which means forming an annular chamber for confining a quantity of viscous fluid is supported on said first torque means, said means having one flexible exposed wall, and said second torque means comprises means having a surface to contact said flexible wall and mounting means to cause said surface to orbit around said annular recess in compression against said surface to a degree dependent on the mass of said supported weight.

8. A system as defined in claim 1 in which said first torque means comprises a disc mounted on a first axis having an annular recess on one side closed by a flexible diaphragm confining a quantity of viscous fluid, and said second torque means comprises a disc mounted on an axis at an angle to said first axis having a portion to contact said diaphragm and movable in rotation to nutate around said diaphragm in compression to a degree dependent on the mass of the supported weight.

9. A system as defined in claim 1 in which said first torque means has a recess defining a cylindrical wall, a closed toroidal tube positioned against said wall and confining a quantity of viscous fluid, said second torque means comprises a roller mounted to ride on a surface of said toroidal tube, and means mounting said roller to compress said tube to a degree responsive to the mass of said supported weight.

10. A system as defined in claim 9 in which said first torque means comprises a pulley having a supporting tracking groove on an outer diameter and an inner cylindrical wall to support said toroidal tube.

11. A system as defined in claim 1 in which said first torque means has an internal annular recess on a first axis closed by a circular flexible strip of material to confine a quantity of viscous fluid, and said second torque means comprises a roller member eccentric to said first axis, and means to mount said roller on a pivoting axis to move said roller into compression contact with said closing strip to a degree responsive to the mass of the supported weight.

12. A system as defined in claim 1 in which a track pulley and said second torque means are operatively associated to rotate together when said pulley is rolling on a track, a shaft mounting said second torque means, a weight support arm pivoted relative to said first torque means, and means connecting said support arm and said shaft wherein pivotal movement of said arm in response to a supported weight causes said shaft to shift axially to move said second torque means relative toward said first torque means to increase the proximity of said torque means.

13. A system as defined in claim 1 in which a track pulley is rotatably mounted on a first shaft and serves as the first torque means, a closed toroidal chamber having a flexible wall and mounted on an annular surface of said pulley enclosing a body of viscous fluid, a weight supporting arm having a movable relationship relative to said first shaft, a second shaft cantilevered on said arm, and the second torque means comprises a roller mounted on said second shaft radially in contact with said flexible wall.

14. A system as defined in claim 1 in which said first torque means has a closed annular recess with a flexible annular wall enclosing a body of viscous fluid, a rotatable shaft on a first axis coaxial with said recess having at one end a track pulley to roll on a track, said shaft having at the other end a cocked section disposed at an angle to said first axis, said second torque means being rotatably mounted on said cocked section and comprising a disc tilted against said flexible annular wall, a load arm pivotally associated with said first torque means and said shaft, and cam means associating said shaft with said first torque means wherein a load on said arm moves said first torque means against said second torque means in a relative nutating motion to effect pressure on said viscous fluid.

* * * * *